United States Patent [19]

Andersen

[11] Patent Number: 4,568,813
[45] Date of Patent: Feb. 4, 1986

[54] ELECTRODE FOR ARC WELDING AND METHOD FOR UNDERWATER WELDING

[76] Inventor: Leonard M. Andersen, 46 Alexander Ave., Yonkers, N.Y. 10704

[21] Appl. No.: 497,655

[22] Filed: May 24, 1983

[51] Int. Cl.⁴ .......................................... B23K 35/365
[52] U.S. Cl. ....................................... 219/72; 149/37; 219/145.1; 219/146.1
[58] Field of Search ............. 219/146.1, 146.22, 145.1, 219/145.23, 145.41, 72; 148/24, 26; 75/257; 106/136, 193 M; 427/201, 202, 208.4, 208.8, 414; 149/37; 252/70, 315.3

[56] References Cited

U.S. PATENT DOCUMENTS

| | | | |
|---|---|---|---|
| 2,410,461 | 11/1946 | Ronay | 219/145.41 |
| 3,694,259 | 9/1972 | Chapman | 148/26 |
| 4,220,487 | 9/1980 | Andersen | 148/24 |
| 4,392,908 | 7/1983 | Dehnel | 427/201 |

FOREIGN PATENT DOCUMENTS 616102  7/1978  U.S.S.R. ........................... 219/145.1

Primary Examiner—Roy N. Envall, Jr.
Assistant Examiner—Alfred S. Keve
Attorney, Agent, or Firm—Darby & Darby

[57] ABSTRACT

An electrode comprising a base rod and a hard coating is coated with a powder coating comprising thermite, a gelling agent, and optionally particles of hard coating material that swells upon contact with water and forms a gelatinous coating upon use in underwater arc welding, and acts as an insulating, coating, and fluxing agent in underwater arc welding is disclosed.

16 Claims, 2 Drawing Figures

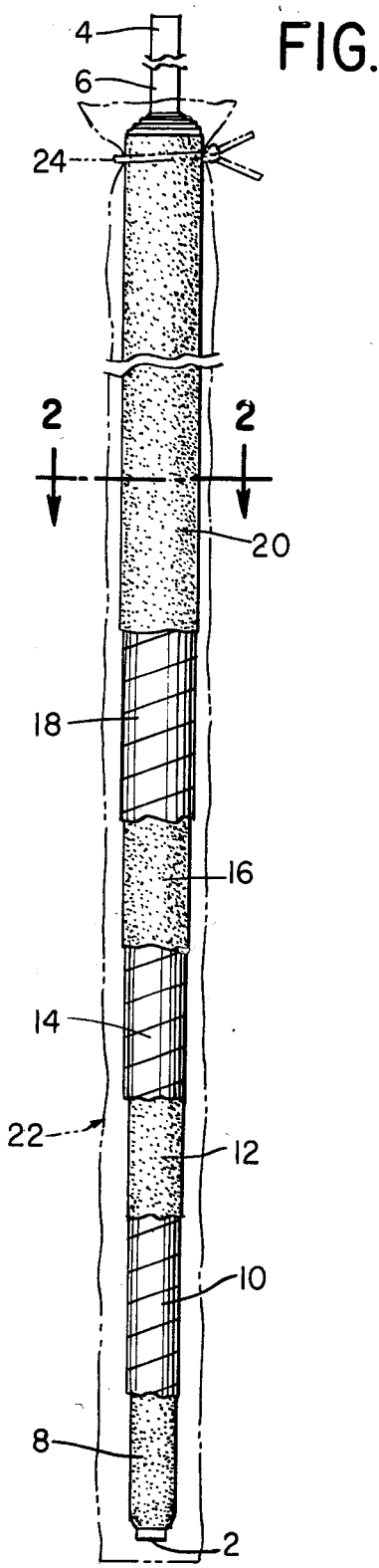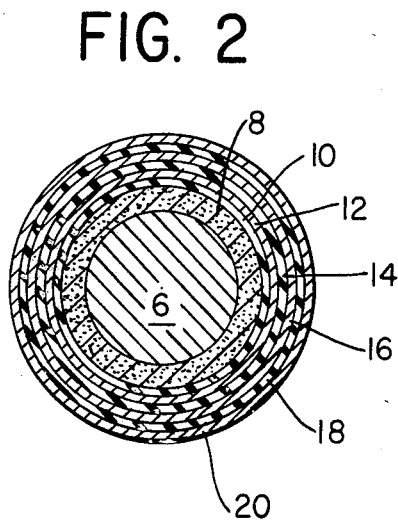

ELECTRODE FOR ARC WELDING AND METHOD FOR UNDERWATER WELDING

BACKGROUND OF THE INVENTION

The present invention relates to an arc welding electrode having a fine powder coating which swells upon immersion in water and forms a gelatinous coating upon use that serves as an insulation coating, a heat source, an arc enhancer, and a fluxing agent in underwater arc welding.

Arc welding encompasses a variety of methods for joining metals, all of which involve the use of an electric arc as a source of heat to melt and join metals. The arc is initiated and sustained between a workpiece and an electrode. The electrode is then moved along the joint to be welded. The function of the electrode is to conduct a supplied current and to sustain the electric arc between the electrode's tip and the workpiece. There are two types of electrodes: consumable and non-consumable. The consumable electrode is specially prepared so that it not only conducts current and sustains the arc, but it also melts and supplies filler metal to the weld site.

At present, underwater welding involves the use of coated, consumable electrodes of the straight polarity type similar to those used in surface welding. The electrode hard coating acts as a fluxing agent, which prevents, dissolves, or faciliates removal of oxides and other undesirable surface substances. By creating a reducing or non-oxidizing atmosphere enveloping the arc, the electrode hard coating prevents contamination of the metal by oxygen and nitrogen. Absent such a reducing atmosphere, the oxygen would readily combine with the metal causing porosity and oxidation of the weld. Reaction with nitrogen would cause brittleness, low ductility and possibly low strength and poor corrosion resistance. Electrode hard coatings also facilitate arcing by insulating the sides of the electrode so that the arc is concentrated to a confined area. In addition, the electrode hard coating serves as a thermal insulator in underwater welding, thereby concentrating heat at the electrode tip.

The electrode hard coatings reduce impurities such as oxides, sulphur and phosphorus which tend to impair the deposited weld, and aid in ionization and maintenance of the arc. Electrode hard coatings provide material, such as silicates, which forms a slag over the deposited weld. The slag retards heat transfer between the deposited weld and the surrounding water and allows the deposited weld to cool and solidify slowly. The slow cooling eliminates entrapment of gases within the weld, permits solid impurities to float to the surface and has an annealing effect on the deposited weld.

There are four types of electrode hard coatings in general use. These are iron powder coatings, cellulose coatings, mineral coatings and combinations of cellulose and mineral coatings. Conventional electrode hard coatings contain some or all of cellulose, limestone, fluorspar, rutile, titania, asbestos, iron powder, iron oxide, clay ferro-silicon, ferromanganese and sodium silicate.

Specifications for electrode hard coatings are issued by the American Welding Society and American Society for Testing and Materials. Suitable electrode hard coatings for use with the invention include American Welding Society AWS3, AWS4, AWS6 or AWS8 designation electrode hard coatings. Other electrode hard coatings can be used with maintenance electrodes, non ferrous electrodes and others which do not conform to published specifications.

When welding in air, the electrode hard coating provides a slag deposit which covers and protects the deposited weld. However, steam generation and thermal shock created in underwater welding can cause the slag formed by the electrode hard covering to pop off the weld. The resultant quenching and undesirable rapid cooling of the deposited weld may cause embrittlement of the deposited weld. Thus, if adequate protection from water is not provided, the strength and ductility of welds formed underwater typically are lower than that obtainable using above surface welding.

One object of the present invention is to provide an underwater welding electrode capable of producing underwater welds of greater strength and ductility than previously possible. Another object of the present invention is to provide an underwater welding electrode with improved thermal insulating characteristics which facilitates arcing and more efficiently retards heat loss. Yet another object of the present invention is to provide an underwater welding electrode with enhanced arcing capability which will allow longer and varying arc lengths, similar to those encountered in above water welding. Still another object of the present invention is to provide an underwater welding electrode which allows smoother, more efficient welding. Yet another object of the present invention is to provide a simple underwater welding electrode to allow the underwater use of conventional surface electrode holders with limited modification, enabling surface welders with minimum training in underwater welding to function suitably as welder/divers. Another object of the present invention is to provide a dry powder coating on magnetized electrodes and/or pieces to be welded which will form and release a gel which will flow to the weld arc, imparting to the weld formed greater strength and ductility than previously possible. A further object of the present is to provide an electrode for welding in flammable or explosion-prone atmospheres.

SUMMARY OF THE INVENTION

The above and other objects are achieved by a water activated powder coating for consumable electrodes for use in underwater arc welding applications. The coating comprises a dry mixture of thermite, a gelling agent, and optionally particles of hard coating material.

DETAILED DESCRIPTION

A suitable gelling agent is carboxy vinyl polymer, such as the Carbopol brand of carboxy vinyl polymer manufactured by BF Goodrich Chemical Co. as a dry powder in acid form. After immersion in water, the hydration of Carbopol occurs. The hydrated Carbopol resin is neutralized with decomposition products of the normal hard coating of the coated electrode and/or thermite in the arc area forming a viscous gel with the thermite powder suspended therein. In addition to carboxy vinyl polymer, a water-swellable starch, water-swellable gum or water-swellable polymer may be used as the gelling agent. The viscosity of the gel should be approximately 25,000 to 75,000 centipoise, and preferably about 50,000 centipoise, and its density approximately that of water. These characteristics tend to keep the gelatinous coating in place underwater. The mixture is applied to the hard coating of standard underwater electrodes, to which an adhesive has been applied. This step is repeated as necessary until a sufficiently thick coating of the powder has been applied. The entire electrode is then wrapped in a waterproofing material for protection against humidity.

Upon immersion in water, with the waterproofing material removed, the powder swells, and upon use of the electrode forms a gel of a viscosity sufficient to retard heat transfer by convection, but not so viscous as to be difficult to handle. This effect is pronounced in the vicinity of the arc where hard coating decomposition occurs. The water is agitated and becomes more alkaline, enhancing gel formation from the power coating and increasing its viscosity.

Thermite, a mixture of ferric oxide and aluminum, provides additional heat to compensate for heat lost during the welding process and provides greater ductility and causes less embrittlement of the deposited weld than is possible with conventional underwater welding techniques. Thermite forms a conductive bridge between the electrode and the workpiece due to the high conductivity of the aluminum contained in the thermite making arc initiation, restart, and maintenance easier. The adhesive, necessary to cause the powder to adhere to the hard coating of the electrode, is conveniently provided in the form of adhesive transfer tape. The adhesive layer must be thin enough so as not to interfere with the weld process, elastic enough to allow for swelling associated with gel formation, and strong enough to retain the powder in concentric layers about the electrode until consumed in the wet welding process. The waterproofing cover can be of polyethylene or a similar material. The cover is secured to the electrode so that water is kept off of the powder coating but the electrode holder end of the electrode is left bare so that the electrode remains conductive to electricity.

BRIEF DESCRIPTION OF THE DRAWINGS

FIG. 1 is an elevational partial cut away view of a preferred embodiment of the coated electrode of the present invention; and FIG. 2 is a horizontal cross section of the electrode of FIG. 1 showing the various layers of the electrode.

DETAILED DESCRIPTION OF THE INVENTION

Before explaining the present invention in detail, it is to be understood that the invention is not limited in its application to the details of construction and arrangements of parts illustrated in the accompanying drawings, since the invention is capable of other embodiments and of being carried out in various other ways. Also, it is to be understood that the phraseology or terminology employed herein is the purpose of description and not limitation.

Referring now to the drawings and in particular to FIG. 1, there is shown one embodiment of the coated electrode of the present invention. To prepare the coated electrode, a suitable waterproofed welding electrode having a hard coating as described above, such as a Craftweld electrode or an Inconel 182 underwater wet welding electrode (the type currently used by the United States Navy) is obtained. The electrode comprises base metal rod 6 and hard coating layer 8 distributed evenly about the outer surface of rod 6 except for arc tip 2 and electrode holder end 4 which are left with bare metal exposed in order to properly conduct electricity.

2 mil thick adhesive transfer tape (3M, manufacturer's no. 465) Scotch brand type, 1 inch width, is spirally wound over the surface of hard coating 8 about the electrode to form adhesive layer 10. The tape is tightly wound about the hard coating in order to impart good adhesion of the adhesive film layer of the transfer tape to hard coating 8 of the electrode.

A dry powder coating comprising approximately two parts by weight of thermite, one part by weight particles of Carbopol brand dry carboxyl vinyl polymer, and optionally less than 1% by weight of particles of hard electrode coating material is applied to adhesive layer 10 which has been applied to hard coating 8 of electrode 6. Preferably, the particle size of the powder coating is smaller than can pass through an ASTM 300 mesh screen. The powder coating is advantageously applied to the electrode with force for better adhesion so that uniform dry powder coating 12 of approximately 1/32 inches thick is obtained on adhesive layer 10. Excess powder is shaken off the electrode and then another layer of adhesive 14 is applied over dry powder coating 12 using the same technique which resulted in adhesive layer 10.

Once again another layer 16 of dry powder coating is applied to the electrode. This process can be continued until a sufficiently thick layer of powder coating is obtained (ideally 1-6 layers). The recommended thickness of the coating, i.e., the number of layers to be applied, is dependent on such factors as rod diameter, arc obscurity, electrical current consumption, the type of hard coating used, and the type of welding technique used. In FIG. 1 three layers of powder coating have been applied to the electrode (layers 12, 16, and 20). After the final layer of powder coating has been applied to the electrode, excess powder is shaken off and the completed electrode is sealed in a waterproof container, e.g. a polyethylene plastic bag sealed with a rubber band, adhesive or tape which leaves the electrode holder end 4 exposed.

The polyethylene individual packaging remains on the electrode (unopened) until just prior to its use underwater. This is to facilitate handling of the electrode under wet conditions without damaging the powder (or gelatinous coating). The electrode of the present invention can be packaged in a Rodguard polyethylene screw top container, manufactured by Rodguard, Inc., Buffalo, N.Y., which serves as an additional moisture barrier.

To use the electrode, a welder/diver proceeds generally as with other underwater wet welding electrodes. The polyethylene cover can be pierced by dragging the electrode on the workpiece or by pushing the rod through the polyethylene. Depending on the task and the welder/diver's preference, the polyethylene cover can be burned away, torn away or pushed to the holder end of the electrode in order to expose the powder coating to water. The initiation of the arc is facilitated by the powder coating, allowing the wet welding to proceed with little or no preparation of the pieces to be joined. The welder/diver can proceed with any standard underwater welding technique. Using the electrode of the present invention, the hot stitch (hot pass) welding technique has yielded less hard (more annealed) weldment than achieved using the normal close arc technique. The "hot stitch" or "hot pass" technique involves using an e.g., ⅛ inch diameter electrode to form a 3/16 inch arc. The arc forms a puddle of molten metal whereupon the arc is depressed into the puddle approximately ⅛ inch to displace the slag and weldment. A reciprocating "stitching" motion is utilized along the weld path with ½ inch cycles at approximately 30 cycles/minute. Due to the electrode's stable "shrouded" arc feature, multi-pass wet welds of good quality have been achieved by most underwater welders. This technique imparts at least three times as much heat per unit distance to the weld as the stringer technique.

Heat created by the arc generated between electrode and workpiece scorches the gelatinous coating creating a relatively viscous material sufficient to thermally insulate the welding area by greatly curtailing further heat loss from the slag which remains in place. This phenomenon is known as the shrouded arc. The insulating characteristic of the gelatinous coating serves to facilitate arcing and improve weld ductility due to slower cooling.

The arc can be interrupted for up to hour or more underwater and still be easily restarted, obviating a problem found with other wet welding electrodes. The present electrode has had its hard coating wetted out in preliminary tests and it still functioned, indicating an unlimited depth capability.

The slag formed on the workpiece by the electrode hard coating is polymerically coated, and must be chipped and wire brushed away to achieve a superior weld. The two layer slag of the present electrode (comprising the gelatinous coating and the hard coated slag) slows the cooling of the weldment by exclusion of water, and yields improved weld properties.

In the case of an electrode with a hard coating of iron powder (e.g., the AWS E7018) waterproofing can be achieved by dipping the electrode in polyurethane paint or a similar polymeric coating system, e.g. Varithan, manufactured by Flecto Co., California.

Although the invention is intended for use with consumable electrodes underwater, other welding applications such as exothermic, gas metal arc welding (metal inert gas-MIG), and gas tungsten arc welding (tungsten inert gas-TIG) may be used, as well. The present invention may also be used for welding in flammable or explosive environments without the concomitant purging of the dangerous atmosphere usually associated with welding in such environments.

The gelatinous coating improves weld quality in underwater welding to such an extent in terms of strength, ductility and welding speed, that underwater welding becomes a feasible method of making permanent underwater repairs, particularly on pipelines. The efficiency of the method of underwater welding also makes it an attractive method in large fabrication applications.

What is claimed is:

1. In an arc welding electrode having a conventional hard coating, the improvement comprising: a powder coating comprising a gelling agent and thermite applied to said conventional hard coating, the quantity of said powder coating being sufficient to retain fluidity of the gelatinous coating formed on contact of said powder coating with water and electrode decomposition products, to allow said thermite to provide a sufficiently exothermic reaction to provide additional heat during the arc welding process, and to be electrically conductive enough to enhance arc initiation, re-initiation and stability.

2. The electrode of claim 1 wherein said powder coating further comprises particles of electrode hard coating material.

3. The electrode of claim 1 wherein said gelling agent is selected from the group consisting of carboxy vinyl polymer, water-swellable starch, water-swellable gum and water-swellable polymer.

4. The electrode of claim 1 wherein said gelatinous coating formed by contact of said powder coating with water and subsequently with electrode decomposition products is of a viscosity of between 25,000 and 75,000 centipoise.

5. The electrode of claim 1 wherein the particles of said powder coating are of less than ASTM 300 mesh screen size.

6. The electrode of claim 1 wherein said powder coating comprises approximately 1% by weight of particles of electrode hard coating, approximately two parts by weight of thermite, and one part by weight of carboxy vinyl polymer in dry acid form.

7. The electrode of claim 4 wherein said gelatinous coating has a viscosity of approximately 50,000 centipoise.

8. The electrode of claim 1 wherein said conventional hard coating comprises primarily iron powder.

9. The electrode of claim 1 additionally comprising an airtight wrapping surrounding and protecting said powder coating.

10. The electrode of claim 9 wherein said airtight wrapping comprises polyethylene film.

11. The electrode of claim 1 wherein said powder coating is applied to said hard coating using an acrylic pressure-sensitive adhesive.

12. The electrode of claim 1 wherein said electrode is an oxy-arc tubular type cutting electrode.

13. A powder coating composition comprising one part gelling agent and two parts thermite which upon immersion in water and subsequent contact with decomposition products of the hard coating of a conventional consumable arc welding electrode forms a gelatinous coating for use as an insulating, coating and fluxing agent with conventional arc welding electrodes.

14. A process for arc welding in a flammable or explosive atmosphere using an arc welding electrode comprising a base rod; a conventional hard coating applied to said base rod; and at least one layer of a powder coating comprising a gelling agent and thermite applied to said conventional hard coating, the quantity of said powder coating being sufficient to retain fluidity of the gelatinous coating formed on contact of said powder coating with water and electrode decomposition products, to allow said thermite to provide a sufficiently exothermic reaction to provide additional heat during the arc welding process, and to be electrically conductive enough to enhance arc initiation, re-initiation and stability, which comprises: welding with said electrode while exposing said electrode and the immediate welding area to a continuous spray of water to minimize the risk of combustion or detonation.

15. An arc welding electrode comprising a base rod; a conventional hard coating applied to said base rod; and at least one layer of a powder coating comprising carboxy vinyl polymer and thermite applied to said hard coating; the quantity of said powder coating being sufficient to retain fluidity of the gelatinous coating formed on contact of said powder coating with water and electrode decomposition products, to allow said thermite to provide a sufficiently exothermic reaction to provide additional heat during the arc welding process, and to be electrically conductive enough to enhance arc initiation, re-initiation and stability.

16. The electrode of claim 15 wherein said base rod comprises primarily tungsten or an alloy thereof.

* * * * *